(12) United States Patent
Moisio et al.

(10) Patent No.: US 8,570,995 B2
(45) Date of Patent: Oct. 29, 2013

(54) APPARATUS AND METHOD FOR PROVIDING ACCESS TO A LOCAL AREA NETWORK

(75) Inventors: Martti Moisio, Haarajoki (FI); Klaus Doppler, Albany, CA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/498,854

(22) PCT Filed: Sep. 30, 2009

(86) PCT No.: PCT/IB2009/054287
§ 371 (c)(1),
(2), (4) Date: Mar. 28, 2012

(87) PCT Pub. No.: WO2011/039572
PCT Pub. Date: Apr. 7, 2011

(65) Prior Publication Data
US 2012/0184284 A1    Jul. 19, 2012

(51) Int. Cl.
*H04W 4/00* (2009.01)
*H04W 72/00* (2009.01)
*H04W 36/00* (2009.01)

(52) U.S. Cl.
USPC ........ 370/338; 370/331; 455/452.1; 455/436; 455/432.1; 455/466

(58) Field of Classification Search
USPC .............. 455/452.1, 450, 509, 464, 448, 466, 455/436–444, 435.1, 410–411; 370/338, 370/331, 351, 395.2–395.43, 252, 470, 370/471–472, 516
See application file for complete search history.

(56) References Cited

U.S. PATENT DOCUMENTS

| | | | |
|---|---|---|---|
| 6,097,961 A * | 8/2000 | Alanara et al. ................ 455/466 |
| 6,314,292 B1 * | 11/2001 | Ho et al. ........................ 455/450 |
| 6,735,195 B1 * | 5/2004 | Mehta ............................ 370/352 |
| 2006/0178131 A1 * | 8/2006 | Huotari et al. ................ 455/410 |
| 2007/0070935 A1 * | 3/2007 | Prakash et al. ................ 370/328 |
| 2007/0082699 A1 * | 4/2007 | Karaoguz et al. ........... 455/553.1 |
| 2007/0243890 A1 * | 10/2007 | Zreiq et al. ..................... 455/466 |
| 2009/0233634 A1 * | 9/2009 | Aghili et al. .................. 455/466 |

* cited by examiner

*Primary Examiner* — Vladimir Magloire
*Assistant Examiner* — Michael Mapa
(74) *Attorney, Agent, or Firm* — Squire Sanders (US) LLP

(57) ABSTRACT

An apparatus, system and method for providing access to a local area network for a mobile station operable in a wide area network such as a Global System for Mobile Communications ("GSM") network. In one embodiment, the apparatus (820) for use with a mobile station includes a resource allocator (831) configured to generate a message for the GSM network requesting at least one characteristic of a local area network. The apparatus (820) also includes an accumulator (832) configured to receive the at least one characteristic of the local area network to enable the mobile station to access the local area network.

19 Claims, 10 Drawing Sheets

APPARATUS AND METHOD FOR PROVIDING ACCESS TO A LOCAL AREA NETWORK

RELATED APPLICATION

This application was originally filed as PCT Application No. PCT/IB2009/054287 filed Sep. 30, 2009.

TECHNICAL FIELD

The present invention is directed, in general, to communication systems and, in particular, to an apparatus and method for providing access to a local area network for a mobile station operable in a wide area network.

BACKGROUND

The Third Generation Partnership Project ("3GPP") is an international association of telecommunications network operators and manufacturers hosted by the International Telecommunications Union ("ITU") to develop and evolve standards for mobile communications systems. The standards developed by the 3GPP have evolved from standards developed for the Global System for Mobile Communications ("GSM"). A GSM system is primarily a mobile communication system employing digital techniques for signaling, speech and data. The wide international deployment of GSM has enabled subscribers to use their mobile telephones in many parts of the world.

A GSM network employs a variant of phase-shift keying ("PSK") with time division multiple access ("TDMA") signaling over frequency division duplex ("FDD") carriers. The GSM standards have evolved to include short message service ("SMS," also referred to as text messaging), packet data capabilities, and higher speed data transmission using Enhanced Data Rates for GSM Evolution ("EDGE").

Design details of the GSM/EDGE are generally provided in the 3GPP Technical Specification ("TS") 45 series issued by the 3GPP. For example, the physical layer specification produced by the GSM/EDGE Technical Specification Group is described in 3GPP TS 45.001 entitled "Radio Access Network; Physical Layer on the Radio Path; General Description," Release 9, dated May 2009, and the modulation specification is provided in 3GPP TS 45.004 entitled "Radio Access Network; Modulation," Release 8, dated December 2008. The overall network architecture is described in 3GPP TS 23.002 entitled "Network Architecture," Release 9, dated June 2009, and an extensive list of technical specifications for GSM systems is given in 3GPP TS 41.101, entitled "Technical Specifications and Technical Reports for a GERAN-Based 3GPP System," Release 8, dated June 2009. The aforementioned specifications and others provided herein are incorporated herein by reference.

The GSM network in 3GPP includes network communication elements providing user plane (including packet data convergence protocol/radio link control/medium access control/physical sublayers) and control plane protocol terminations towards wireless communication devices such as cellular telephones. A network communication element such as a base station is an access entity of a communication network, and the term will generally refer to equipment providing the wireless-network interface in a cellular telephone system, including cellular telephone systems other than those designed under 3GPP standards. A wireless communication device or terminal is generally known as a mobile station ("MS") or as a user equipment ("UE").

Due to uncontrolled circumstances in the operation of a local area network, such as local interference that may be due to unintentional jamming by another radio system operating in the same area or a change in a particular band of frequencies employed by an access point ("AP") in the local area network, a mobile station may not have access to the local area network. During a period of time of non-network use, such as a period of time out of normal working hours or a period of time during which a member of a family is away from home, an efficient power-save operation may be employed at the access point and at the mobile station. The mobile station that enters the serving area of a local area network may not be able to access, initiate communication with or connect to the local area network due to a lack of an access authorization such as an access key. Thus, the mobile station may not be able to access the local area network (in the case of jamming or due to lack of an access key), or the mobile station may have to do a time- and energy-consuming search for the local area network when the local area network changes an operational parameter such as a frequency band or a channel within the band.

In view of the growing deployment and sensitivity of users to communication performance in local and wide area networks, further improvements are necessary for handling a mobile station's access to a local area network. Therefore, what is needed in the art is an apparatus, system and method for providing access to a local area network for a mobile station operable in a wide area network that overcomes the deficiencies of conventional communication systems.

SUMMARY OF THE INVENTION

These and other problems are generally solved or circumvented, and technical advantages are generally achieved, by embodiments of the present invention, which include an apparatus, system and method for providing access to a local area network for a mobile station operable in a wide area network such as a Global System for Mobile Communications ("GSM") network. In one embodiment, the apparatus (e.g., a processor) for use with a mobile station includes a resource allocator configured to generate a message for the GSM network requesting at least one characteristic of a local area network. The apparatus also includes an accumulator configured to receive the at least one characteristic of the local area network to enable the mobile station to access the local area network.

In another aspect, the present invention provides an apparatus (e.g., a processor) for use with a local area support node associated with a GSM network. In one embodiment, the apparatus includes an accumulator configured to receive a message from a mobile station requesting at least one characteristic of a local area network. The apparatus also includes a resource allocator configured to provide the at least one characteristic to enable the mobile station to access the local area network.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. In view of the foregoing, the present invention will be described with respect to exemplary embodiments in a specific context of an apparatus, system and method for providing access to a local area network for a mobile station operable in a wide area network. Although systems and methods described herein are described with reference to a GSM network, they can be applied to any communication system including a 3GPP Long Term Evolution ("LTE") cellular network.

Figure 1:
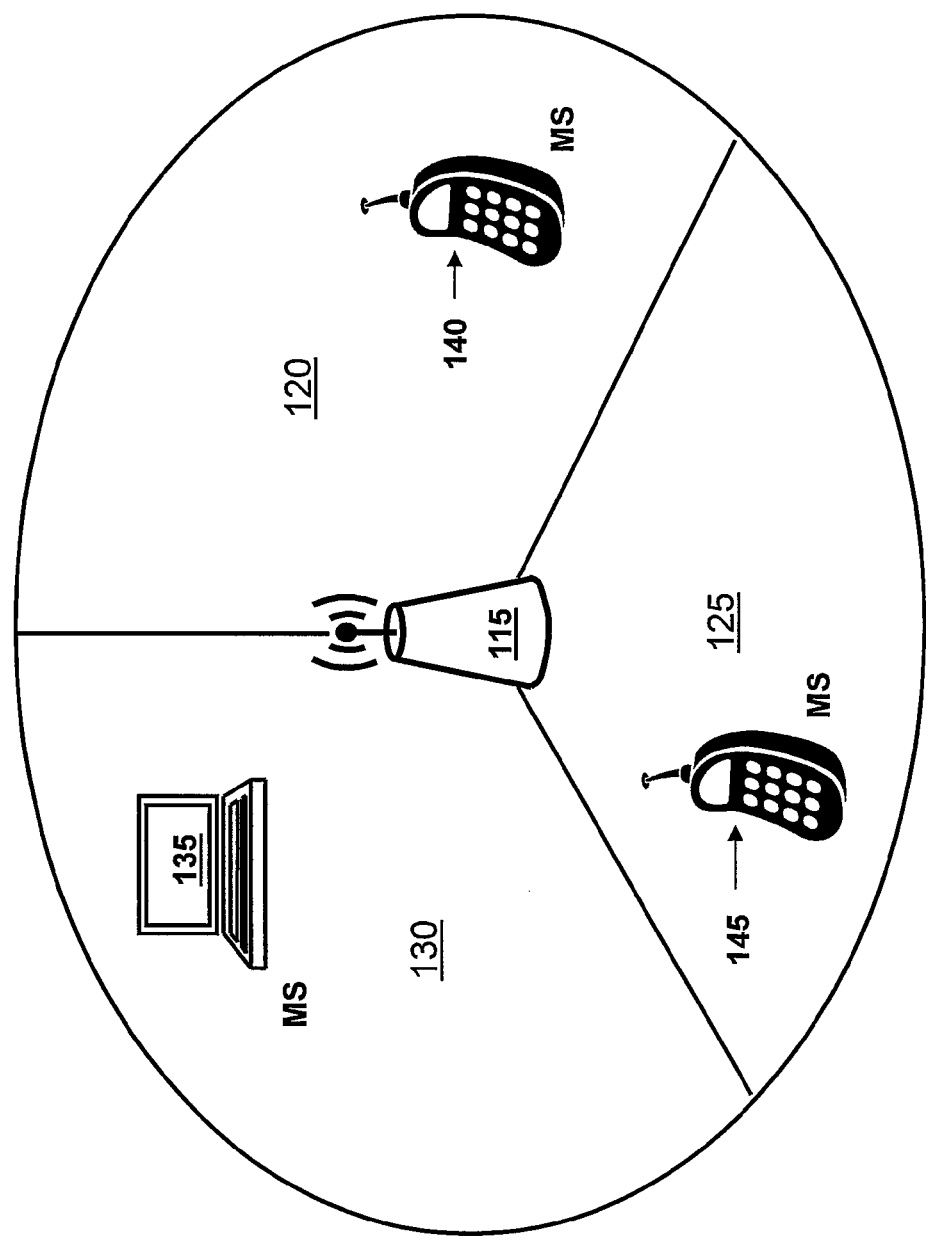
FIGS. 1 and 2 illustrate system level diagrams of embodiments of communication systems including a base station and wireless communication devices that provide an environment for application of the principles of the present invention.

Turning now to FIG. 1, illustrated is a system level diagram of an embodiment of a communication system including a base station 115 and wireless communication devices (e.g., a mobile station ("MS"), also generally referred to as a user equipment ("UE")) 135, 140, 145 that provides an environment for application of the principles of the present invention. The base station 115 is coupled to a public switched telephone network (not shown). The base station 115 (also referred to as a base station system, "BSS") is configured with a plurality of antennas to transmit and receive signals in a plurality of sectors including a first sector 120, a second sector 125, and a third sector 130, each of which typically spans 120 degrees. Although FIG. 1 illustrates one wireless communication device (e.g., wireless communication device 140) in each sector (e.g., the first sector 120), a sector (e.g., the first sector 120) may generally contain a plurality of wireless communication devices. In an alternative embodiment, a base station 115 may be formed with only one sector (e.g., the first sector 120), and multiple base stations may be constructed to transmit according to collaborative/cooperative multiple-input multiple-output ("C-MIMO") operation, etc. The sectors (e.g., the first sector 120) are formed by focusing and phasing radiated signals from the base station antennas, and separate antennas may be employed per sector (e.g., the first sector 120). The plurality of sectors 120, 125, 130 increases the number of subscriber stations (e.g., the wireless communication devices 135, 140, 145) that can simultaneously communicate with the base station 115 without the need to increase the utilized bandwidth by reduction of interference that results from focusing and phasing base station antennas.

Figure 2:
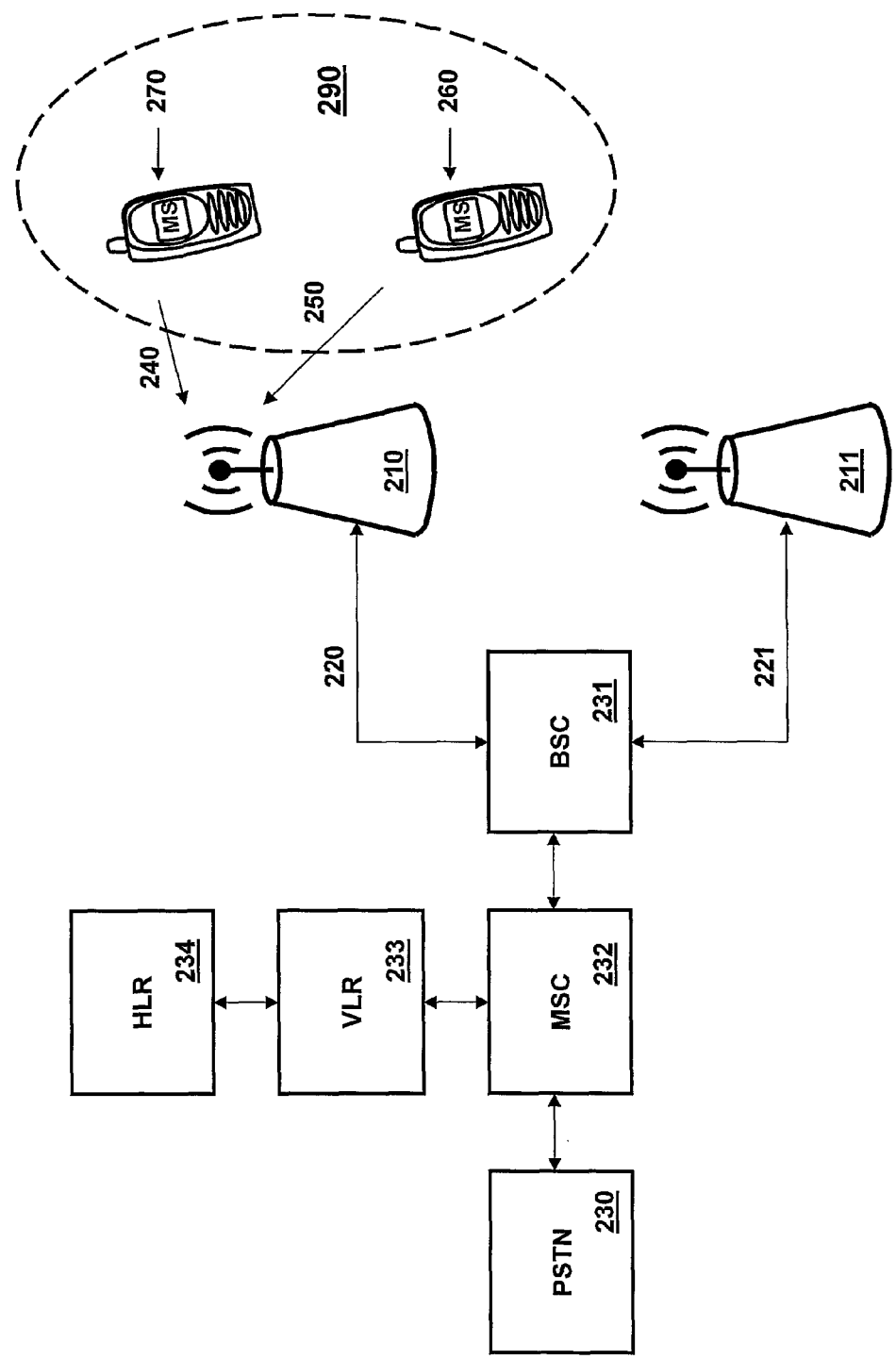

Turning now to FIG. 2, illustrated is a system level diagram of an embodiment of a communication system including wireless communication devices (e.g., a mobile station ("MS")) 260, 270, that provides an environment for application of the principles of the present invention. The communication system includes base stations 210, 211 coupled by communication paths or links 220, 221 (e.g., by a fiber-optic communication path) to a core telecommunications network such as public switched telephone network ("PSTN") 230 through a base station controller ("BSC") 231 and a mobile switching center ("MSC") 232. The base station controller 231 provides a level of control behind a group of base stations 210, 211. The base station controller 231 handles allocation of radio channels, receives measurements from the mobile stations 260, 270, controls handovers from base station to base station. The mobile switching center 232 is the primary service delivery node for GSM service that handles voice calls and short message service as well as other services such as conference calls, facsimile and circuit switched data. The mobile switching center 232 sets up and releases the end-to-end connection, handles mobility and hand-over requirements during the call and takes care of charging and real-time pre-paid account monitoring.

The base station 210 is coupled by wireless communication paths or links 240, 250 to the mobile stations 260, 270, respectively, that lie within its cellular area 290. The mobile switching center 232 may be coupled to a visitor location register ("VLR") 233 that in turn is coupled to a home location register ("HLR") 234. The visitor location register 233 provides a listing of current mobile stations 260, 270 that have roamed into the particular area served by one or more base stations 210. The home location register 234 is a central network database that contains details of each mobile station subscriber that is authorized to use the GSM network. A subscriber identity module ("SIM") (a removable card in a mobile station 260, 270) stores the subscriber's key that identifies the subscriber, phone number, network authorization data, personal security keys, contact lists, and stored text messages on a mobile station such as a personal computer to the home location register. Security features for the subscriber identity module include authentication and encryption measures to protect data therein and to prevent eavesdropping. The subscriber identity module allows a user to change mobile stations 260, 270 by simply transferring the subscriber identity module into another mobile station 260, 270.

In operation of the communication system illustrated in FIG. 2, the base station 210 communicates over an air interface with each wireless communication device 260, 270 through control and data communication resources allocated by the base station 210 over the communication paths 240, 250, respectively. A standard for the air interface can conform to any suitable standard or protocol, and may enable voice and data traffic such as data traffic enabling Internet access. The air interface may include, without limitation, time division multiple access ("TDMA") that supports a GSM or related protocol. The system illustrated in FIG. 2 may include further network elements such as a Serving General Packet Radio Service ("GPRS") Support Node ("SGSN") (not shown).

It is recognized that local area networks such as WiFi networks can provide an alternative means of telecommunication access for a mobile station compared to Global System for Mobile Communications ("GSM"), the Universal Mobile Telecommunications System ("UMTS"), High Speed Packet Access ("HSPA") and LTE cellular networks. Unlike a wide area network, a local area network such as WiFi can utilize portions of the license-exempt spectrum to take advantage of additional bandwidth to provide high-speed telecommunications access. Since a mobile station will likely be able to operate with a transceiver that can access the local area network and the wide area network, the wide area network can be utilized to enhance the mobile station experience in the local area network. Applications (e.g., middleware) running on the mobile station can decide whether use an available local area network, the wide area network, or both at the same time for Internet services. The local area network can be structured so that selected services such as voice or emergency calls will still be available to the mobile station through the wide area network. Hence the mobile station will not completely hand over its telecommunications operations to the local area network, but dual radio operation is preferable when accessing the local area network. Thus, a level of cooperation between the wide area network and the local area network during local area network access is preferable.

As used herein, a wide area network (or system or communication system) refers to a network that provides wireless communication services employing a plurality of base stations with access to a common backbone such as a PSTN. A wide area network provides communication services over a broad physical area including communication paths or links that cross metropolitan, regional or national boundaries. The operation of the plurality of base stations is coordinated across the wide area network so that the mobile station can move seamlessly with handovers across the broad physical area served by the wide area network. Examples of wide area networks include networks operated by commercial telecommunication operators such as Verizon and AT&T for the benefit of customers, with telecommunications services provided under established tariffs. The wide area networks may be structured with systems designed according to 3GPP specifications, including various levels of advanced capability, or with other standards such as compatible with 3GPP LTE or Worldwide Interoperability for Microwave Access ("WiMAX") communication systems.

A local area network (or system or communication system) refers to a network that provides isolated nodes of communication service by an enterprise such as a home, office, hotel, campus, airport, and for enterprise members such as family members, students or employees.

The services provided at one node of a local area network are generally not coordinated with services provided by another node. A local area network is typically managed by the enterprise or a surrogate thereof. For example, a person may turn off a router that provides services in his home, or change the channels over which the local area network operates. The operation of a router in one home will generally be uncoordinated with the operation of a router in a neighbor's home, and access to one will not be coordinated with access to the other. A local area network may be coupled to a PSTN through a port such as a fiber port, a coaxial line, one or more tip-and-ring pairs, or a microwave link that communicates with the PSTN through a wide area network. An example of a local area network is a wireless network in a home or business environment operating under the IEEE standards 802.11, which is incorporated herein by reference, that describe WiFi communication.

The 3GPP is a likely forum for standardization of a wide area network such as the LTE cellular network operation with a wireless local area ("LA") network or system. A GSM network would be positioned as a 3GPP system, challenging current wireless local area network ("WLAN") systems structured with earlier designs. To achieve standardization in 3GPP, acceptance from system operators is needed. An area of interest for wireless operators is that they can offload bulk Internet traffic from the wide area network to a local area network, while offering a seamless user experience for their services in the local area network. To enable such offloading of services, it is reasonable to assume that local area network operation is supported by the wide area network with cooperation therebetween.

Two possible states of operation can be assumed for operation of a local area network. One state of operation is an integrated system (or operational mode) with a local area network and a wide area network, and another state of operation is a local area network with stand-alone operational mode. The integrated operational mode with the wide area network such as GSM, UMTS, HSPA and LTE, may be the default mode.

Figure 3:
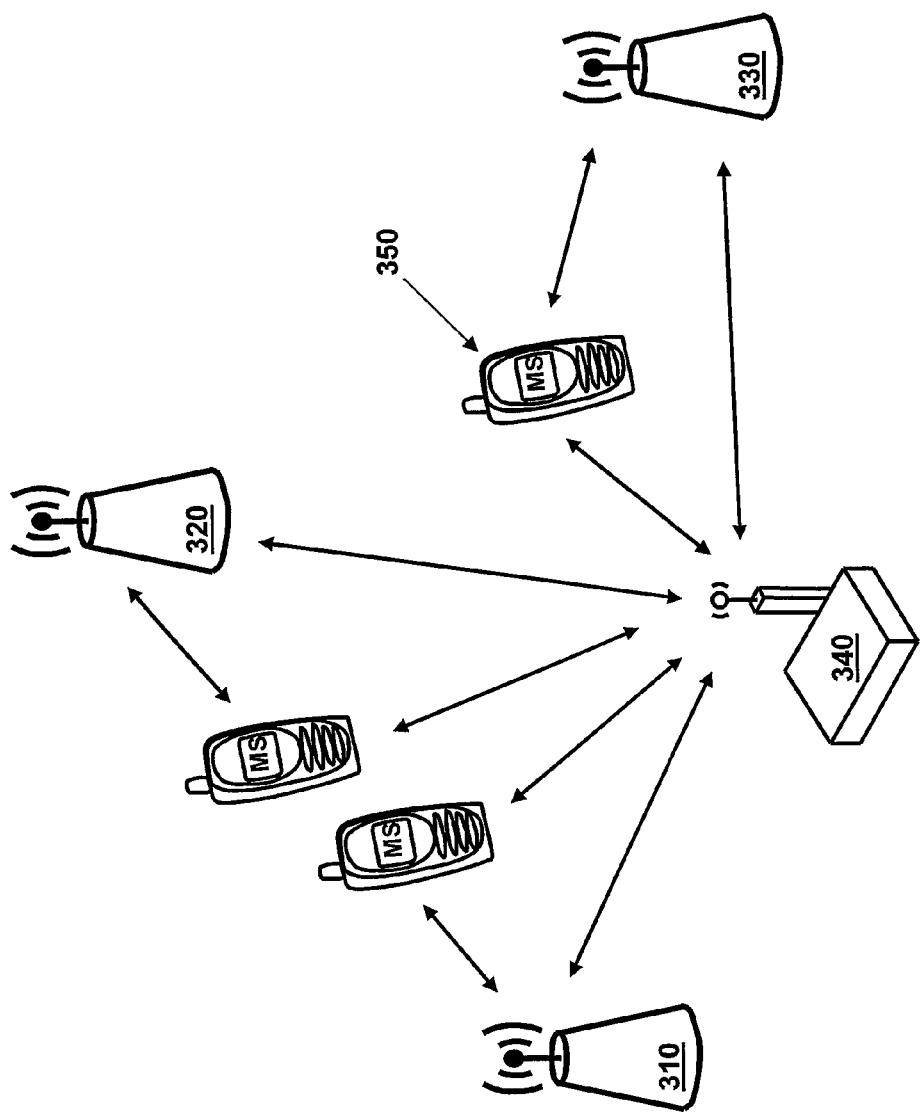
FIG. 3 illustrates a system level diagram of an embodiment of a communication system including a wireless communication system that provides an environment for application of the principles of the present invention.

Turning now to FIG. 3, illustrated is a system level diagram of an embodiment of a communication system including a wireless communication system that provide an environment for application of the principles of the present invention. The communication system includes a wide area network (or wireless communication system such as a GSM network) formed with a plurality of base stations 310, 320, 330 that provide support for the operation thereof and the operation of the local area network. The mobile stations (one of which is designated 350) can communicate with both the wide area network and the local area network. The local area network is formed with a wireless router 340 that provides local wireless communications services, and may provide access to a local computer and perhaps other devices such as a wireless printer. The local area network provides the mobile station 350 with user plane ("U-plane") data and at least a portion of control plane ("C-plane") messages that are supported through the wide area network. As introduced herein, the local area access point such as the router 340 illustrated in FIG. 3 may communicate with a local area support node (or support node) that may be located in a server of the wide area network or in an Internet-related facility as described later.

Control plane messages refers to messages that control traffic transmitted between elements of a network and thus relate to management of the network such as allocation of communication resources to a particular mobile station, admittance of the mobile station to the network, polling messages, handover messages, channel quality information messages, etc. The user plane messages refer to messages containing the actual payload data communicated to or from the mobile station. A network operator thus has visibility of, and makes functional use of, the control plane messages, while the user plane messages are generally not read by the operator and generally contain information of importance only to the user of the mobile station. As introduced herein, a portion of control signaling (i.e., control plane messages) may be sent to and received by the mobile station through the wide area network as user plane.

Figure 4:
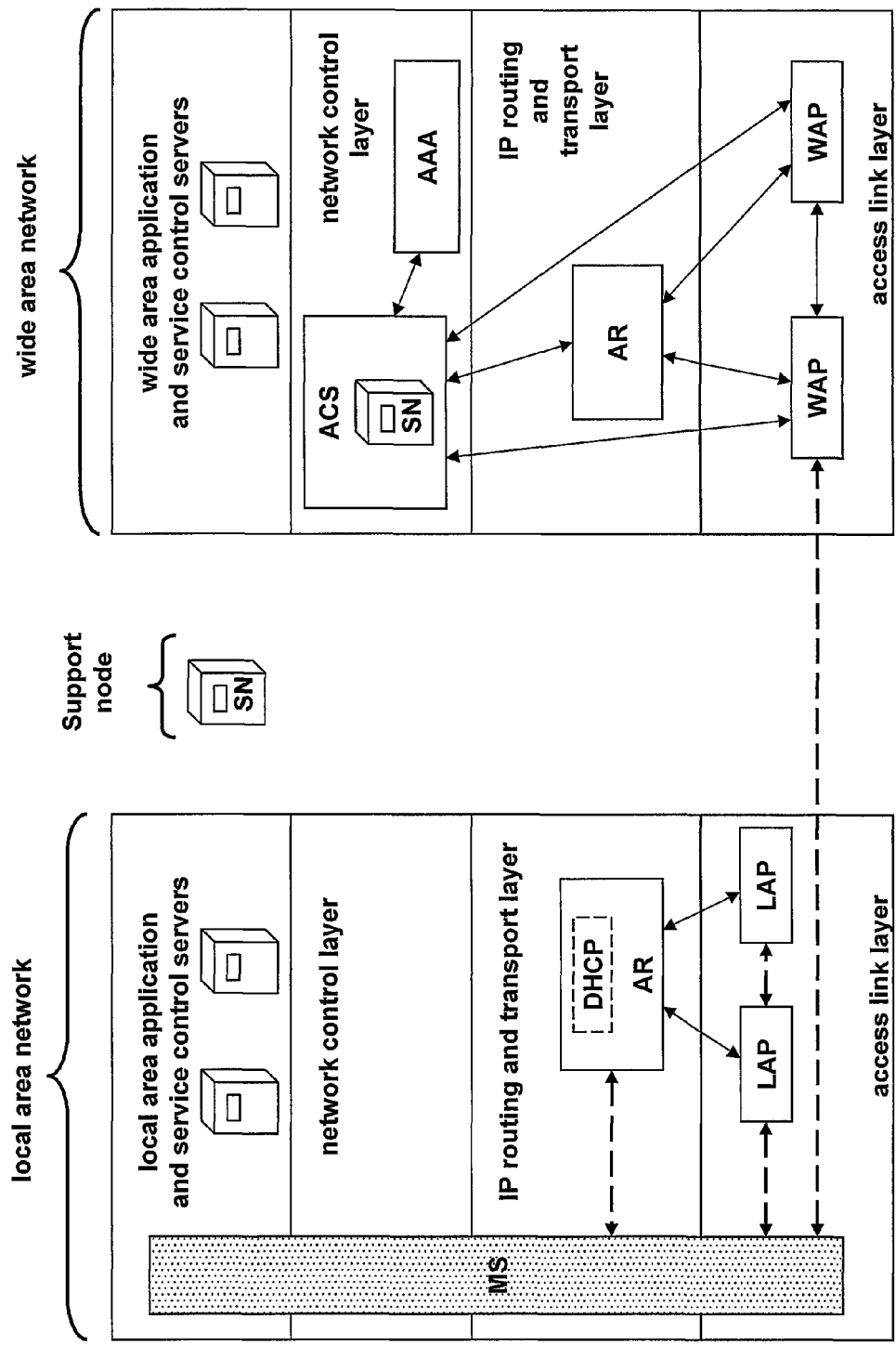
FIG. 4 illustrates a system level diagram of an embodiment of a local area network, a wide area network and a local area support node of a communication system in accordance with the principles of the present invention.

Turning now to FIG. 4, illustrated is a system level diagram of an embodiment of a local area network, a wide area network and a local area support node of a communication system in accordance with the principles of the present invention. The local area network and the wide area network (e.g., a GSM network) and the mobile station have wireless communication capability, and the control plane messages that may be transmitted over these wireless links are represented in FIG. 4 by dashed lines. Four functional layers of the local area network and the wide area network are illustrated in FIG. 4 including local area and wide area application and service control servers, a network control layer, an Internet protocol ("IP") routing and transport layer, and an access link layer. In the wide area network, the network control layer includes an access control server ("ACS") that communicates with an authentication, authorization, accounting server ("AAA"). The access control server communicates with an access router ("AR") in the IP routing and transport layer that in turn communicates with a wide area access point ("WAP"), for example, a base station, in the access link layer.

The mobile station is shown in the local area network. In the local area network, the access link layer includes a local area access point ("LAP") that communicates with an access router that provides dynamic host configuration protocol ("DHCP") services for the local area network. The local area network illustrated in FIG. 4 is supported by local area support node(s) (or support node(s) designated "SN"). The local area support node can be located within a single operator's network, such as in an access control server, and/or within the Internet to support multiple operators, as represented by the local area support node outside of the local and wide area networks. It may be operated, for example, by a consortium of local area network device/access point manufacturers, including a part of the Nokia Ovi ("door" in Finnish) service offering that provides access to games, maps, media, messaging, and music.

The local area support node processes control plane messages and is able to send control plane messages to the access points and to the mobile station via a local area access point such as a local router, or via a wide area access point such as a base station. In cases where the local area support node is within the operator's network, control plane messages may be sent directly to the local area support node, and local area support node functionalities may be integrated inside existing network nodes. In the case where the local area support node is outside the operator's network, the control plane messages are forwarded or tunneled from an existing network node to the local area support node through the Internet. Thus, the local area support node can reach the local area access point through an IP connection.

Figure 5:
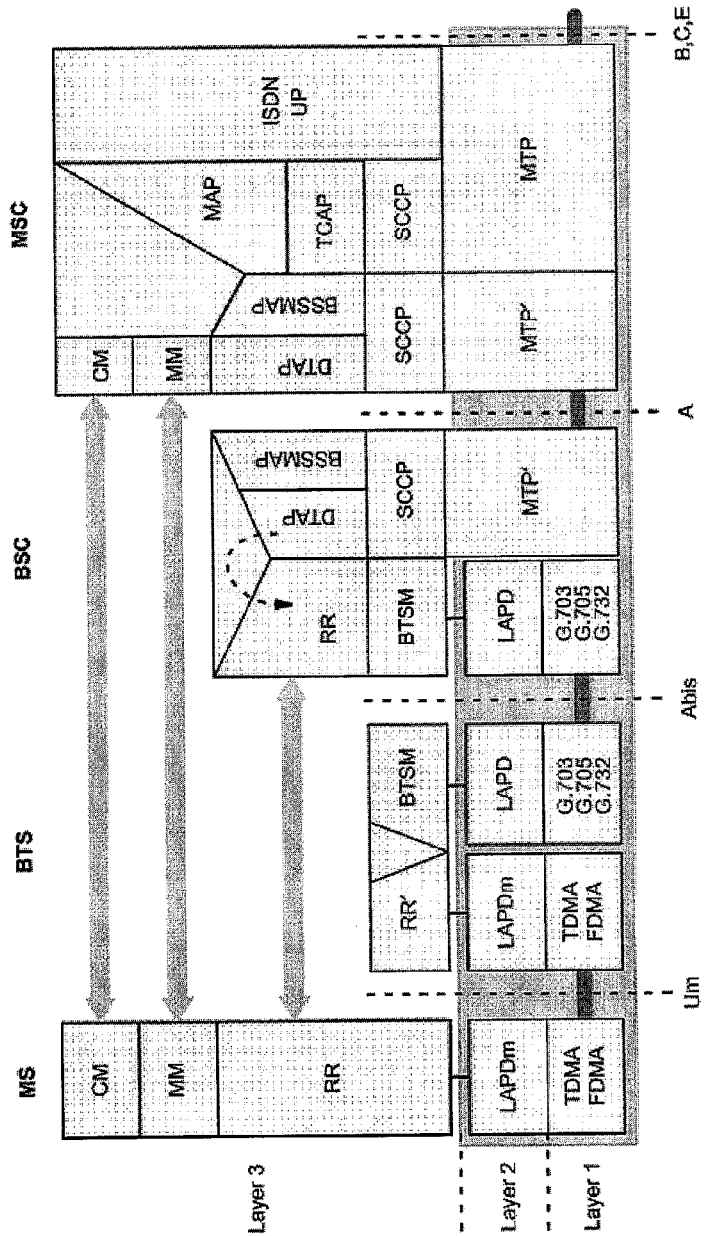
FIG. 5 illustrates a block diagram of an embodiment of a protocol stack of a communication system in accordance with the principles of the present invention.

Turning now to FIG. 5, illustrated is a block diagram of an embodiment of a protocol stack of a communication system in accordance with the principles of the present invention. The illustrated embodiment is a GSM protocol architecture in accordance with FIG. 5.11 of "GSM—Architecture, Protocols and Services," 3$^{rd}$ Edition, Wiley (2009), which is incorporated herein by reference. Selected ones of the acronyms from the protocol stack are provided below.

| Acronym | Definition |
| --- | --- |
| CM | Connection Management |
| MM | Mobility Management |
| RR | Radio Resource Management |
| LAPDm | Link Protocol (adapted for air interface Um) |
| BTSM | Base Transceiver Station Management |
| UP | User Part |
| BTS | Base Transceiver Station |
| MSC | Mobile Switching Center |
| BSSMAP | Base Station System Management Application Part |
| DTAP | Direct Transfer Application Part |
| SCCP | Signaling Connection Control Part |
| TCAP | Transactions Capabilities Application Part |
| MTP | Message Transfer Part |
| MS | Mobile Station |
| BSC | Base Station Controller |

As illustrated in FIG. 5, an element of a GSM system such as an MS, BTS, BSC or MSC can be represented with the Open Systems Interconnect Seven Layer Model that provides a layered communication and computer network protocol design. Layer 1 refers to the physical layer, layer 2 to the data link layer and layer 3 to the network layer. The Um, Abis, A, B, C, and E interfaces are also shown in the FIGURE. FIG. 5 illustrates that mobility management in a mobile station can communicate with a corresponding mobility management in a mobile switching center over, for instance, a stand-alone dedicated control channel ("SDCCH"). Some exemplary control plane messages that may be processed by a local area support node as introduced herein will now be described that may be sent through the wide area network.

The local area network typically operates in the licensed exempt band. Uncertainties of the licensed exempt band can lead to situations where the mobile station can "lose" its network connection, for example, due to a temporary outage of a digital subscriber line ("DSL"), temporary outage of solar powered access point or due to interference (e.g., from another local area network). In such situations, the mobile station can utilize its wide area network connection to obtain information from the local area support node to obtain its operational parameters if the local area network is still operational.

Different from the conventional networks that use a static channel, dynamic spectrum usage is assumed, wherein a local area network can operate in different frequency bands (2.4 gigahertz ("GHz")/5 GHz license exempt band, or in "white spaces," i.e., in unused frequency bands such as frequency bands not assigned to or abandoned by a broadcast facility such as a television broadcast facility) at different times. The mobile station can get information about the currently used local area band and operational parameters of the local area networks through the local area support node to enable faster network discovery. Similar information may also be retrieved when the local area support node supports flexible spectrum usage of multiple local area networks.

The local area support node may be employed to host a database that is employed for white-space operation of the local area network. Through the wide area network, the mobile station is able to retrieve information about the local area networks' operational states (e.g., currently operational state or idle state). The local area network can be employed to support an efficient power-save operation for local area access points such as local area routers, and the mobile station can wake up the access points that are in a stand-by mode by sending a message to the local area support node, for example, when arriving at home or at the office. The local area support node may be employed to store presence information of devices that are available for device-to-device communication, or to assist in discovering local area network service offerings. In general, a local area network should cooperate with all existing wide area networks (such as GSM/UMTS/HSPA/LTE). To perform that function, the local area support node inside a wide area network may encapsulate control plane messages that enhance the user experience in the local area network.

The local area network generally operates in the licensed exempt band. As indicated previously above, uncertainties of, and interferences with, the licensed exempt band can lead to situations where the mobile station can "lose" its connection to the local area network as described previously hereinabove. A local area network may employ dynamic spectrum usage and an efficient power-save operation at both the mobile station and the access point. A mobile station in power save with a long sleep cycle will not be able to follow, for example, a band change of the access point. In such situations the mobile station may either be unable to access the network (in the case of jamming), or it may have to do a time- and energy-consuming search for the local area network when the local area network changes an operational parameter such as a frequency band or a channel within the band. In such a situation, the mobile station can be assisted by the local area support node. It is advantageous to enable fast communication to the local area support node using the GSM network radio interface.

Assistance for frequency reassignments for a mobile station can be obtained by utilizing the user plane of the GSM/evolved GPRS ("E-GPRS") network to send a request to a server that can provide this information. However, setting up the packet data protocol ("PDP") context employable by a mobile station to be able to send and receive data to and from the Internet takes about 1.5 seconds. Additionally, a round-trip time of, for example, 300 milliseconds, should be added to the aforementioned transmission time. To avoid such a long delay, the mobile station could have an active packet data protocol context and operate in an active mode in the wide area network, but this would drastically increase the power consumption of the mobile station due to the wide area operation.

In order to enable a low delay and power efficient operation, at least delay-sensitive messages should be encapsulated in the control plane operation of a GSM/E-GPRS network to obtain this assistance. The mobile station is able to send and receive messages to support an operation thereof in the local area network through control plane messages to a core network node of the GSM/E-GPRS network, and the resulting delays are low since the packet data protocol context setup is not required. The conventional GSM/E-GPRS networks do not operate in such a manner.

As introduced herein, a new apparatus, system and method is presented for encapsulating control plane messages related to local area network operation into control plane messages or user plane messages of a wide area network such as a GSM network. A couple of exemplary options are introduced to encapsulate the control plane messages for transmission on a stand-alone dedicated control channel ("SDCCH") channel or a packet data traffic channel ("PDTCH") of the GSM network. An option is selected based on delay, message length and persistency requirements of the local area messages. The performance of a local area network and end user service quality can be greatly enhanced thereby. An SDCCH may be utilized for transmission of short and delay-sensitive messages to the local area support node. In addition, a mobile switching center may be enhanced with the local area support node functionality to forward the messages to the local area support node, for instance, via an SGSN over the Gs interface between the MSC/VLR and the SGSN for GPRS if the local area support node is outside the wide are network. The SGSN is enhanced with the necessary functionality to convert the received local area support messages into appropriate format before forwarding the same to the SGSN. A mobile station can decide whether to use a SDCCH or a PDTCH depending on message length (e.g., 45 bytes) and delay sensitivity.

It cannot be assumed that a mobile station is in active state in both the GSM/E-GPRS network and in the local area network since the mobile station may be connected to the local area network whenever it is available, for instance, to receive push e-mails. Push e-mails refer to an "always-on" e-mail delivery arrangement wherein e-mails are instantly and actively transferred by a mail server to an e-mail client as the messages arrive. Push e-mails are distinguished from a polling e-mail delivery arrangement wherein a client polls a mail delivery agent such as a server, at login and later at intervals to see if there is new mail and, if so, downloads new e-mail messages to a mailbox in the user's mobile station or computer. Being active in both the local and wide area networks at all times would significantly reduce stand-by time by presenting an added drain on the battery of the mobile station. It is reasonable to assume that a mobile station would receive push e-mail through the local area network when available. It is more energy efficient to receive push e-mails through local area network than the wide area network, and stay in an idle state with respect to the wide area network to receive voice calls.

When the mobile station is in idle state, however, it takes about 1.5 seconds to set up a packet data protocol context to be able to send a request to the local area support node by sending regular user plane messages. Such long delays are not practical in present and future communication systems. The network will also have to keep the mobile station in an active state for a number of seconds, depending on timer settings, which will significantly reduce the operational battery time of the mobile station if the local area control plane messages are regularly sent and received in the user plane.

To describe encapsulation of local area control plane messages in a GSM/E-GPRS network, it is assumed that the mobile station is in idle state (i.e., the mobile station is in a power-save mode). It is assumed in the following that the mobile station initiates a control plane message to the local area support node. Depending on the size of the control plane message, the options depend on message length and delay sensitivity.

In a first option, the stand-alone dedicated control channel is employed for short (e.g., messages up to 45 bytes) and delay sensitive messages. Examples of small and delay sensitive local area control plane messages related to local area control signaling are illustrated in Table I below.

TABLE I

| Message Type | Destination | Sender | Content | Delay Sensitive |
|---|---|---|---|---|
| Location Update | Support Node | MS | Location type (wide area cell identification ("ID"); local area cell ID; geographical coordinates; street address); location information | No |
| Service | Support | MS | Offered Service by MS (available | No |

TABLE I-continued

| Message Type | Destination | Sender | Content | Delay Sensitive |
|---|---|---|---|---|
| Update | | | for device-to-device communication; external screen; external storage; etc) | |
| Wake Up Request | Support Node | MS | Access Point ("AP") ID | Yes |
| Wake Up Response | MS | Support Node | AP ID; Acknowledgement/Non-Acknowledgement ("ACK/NACK") | Yes |
| Operational Parameter Request | Support Node | MS | AP ID | Yes |
| Operational Parameter Response | MS | Support Node | AP ID; Operational parameters of AP (Active/Inactive; used band (channel for white space operation); authentication method (additional information needed to access the AP. e.g., pre-shared key) | Yes |
| Available Services Request | Support Node | UE | AP ID | Yes |
| Available Services Response | UE | Support Node | Offered Service by AP (free access to internet; restricted access to internet; external screen; external storage; etc) | Yes |

In a second option, a packet data traffic channel is employed with associated procedures for sending larger messages. If the packet data traffic channel is not available, for example, if general packet radio service is not supported, a circuit-switched data channel (via a traffic channel ("TCH")) can be used.

A mobile station can decide whether to use the first or second option depending on the message size and the urgency of the message. A message containing a location update or an update on the services offered by the mobile station, such as messages illustrated hereinabove in TABLE I as delay insensitive, can be sent using the packet data traffic channel or a circuit-switched data channel.

As indicated by TABLE I above, a mobile station can supply its present location to a local area support node. A mobile station can determine its present location employing a global positioning system ("GPS") device or by employing triangulation with a plurality of base stations. A mobile station's location can be employed by a local area support node to identify a local area network whose serving area supports the present location of the mobile station.

Figure 6:
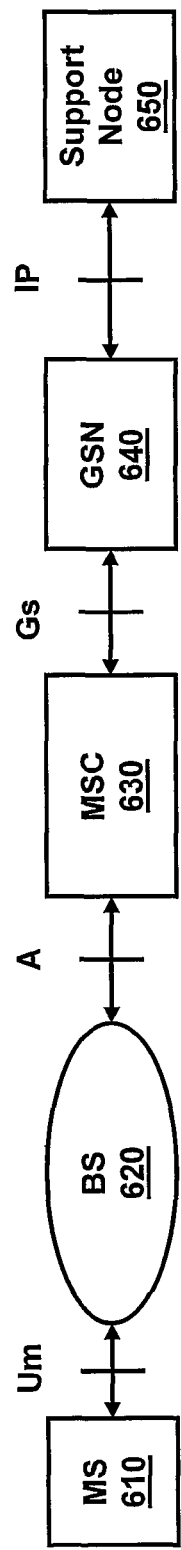
FIGS. 6 and 7 illustrate block diagrams of embodiments of communication paths between a mobile station and a local area support node of a communication system in accordance with the principles of the present invention.

Turning now to FIG. 6, illustrated is a block diagram of an embodiment of a communication path between a mobile station and a local area support node of a communication system in accordance with the principles of the present invention. The mobile station 610 communicates over a Um GSM air interface with a base station 620, and the base station 620 communicates with a mobile switching center 630 over a GSM A interface. The mobile switching center 630 communicates with a GPRS Support Node ("GSN") 640 over a Gs interface, and the GPRS Support Node 640 communicates with a local area support node 650 that is outside the GSM network over an IP interface. The base station 620 includes a base transceiver station and a base station controller, and the GPRS Support Node 640 includes a Serving General Packet Radio Service ("GPRS") Support Node ("SGSN") and a Gateway General Packet Radio Service ("GPRS") Support Node ("GGSN").

Figure 7:
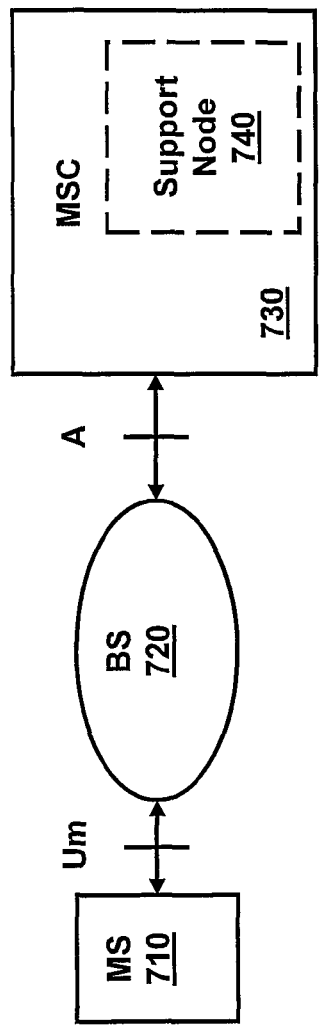

Turning now to FIG. 7, illustrated is a block diagram of an embodiment of a communication path between a mobile station and local area support node of a communication system in accordance with the principles of the present invention. The mobile station 710 communicates over a Um GSM air interface with a base station 720, and the base station 720 communicates with a mobile switching center 730 over a GSM A interface. The base station 720 includes a base transceiver station and a base station controller. The mobile switching center 730 includes the local area support node 740 within the GSM network.

Currently, the stand-alone dedicated control channel is used for location updates, call establishment, and short message service transfers. In a combined configuration of control channels of the GSM network, the stand-alone dedicated control channel can carry one data link layer (L2) frame every 51 multi-frames, and two data link layers (L2) frames in a non-combined configuration. The duration of 51 multi-frames is about 240 milliseconds ("ms"), and one L2 frame carries 184 bits. Thus, in non-combined combination 45 bytes could be sent in one multi-frame with a reasonable air interface delay of 240 ms.

Figure 8:
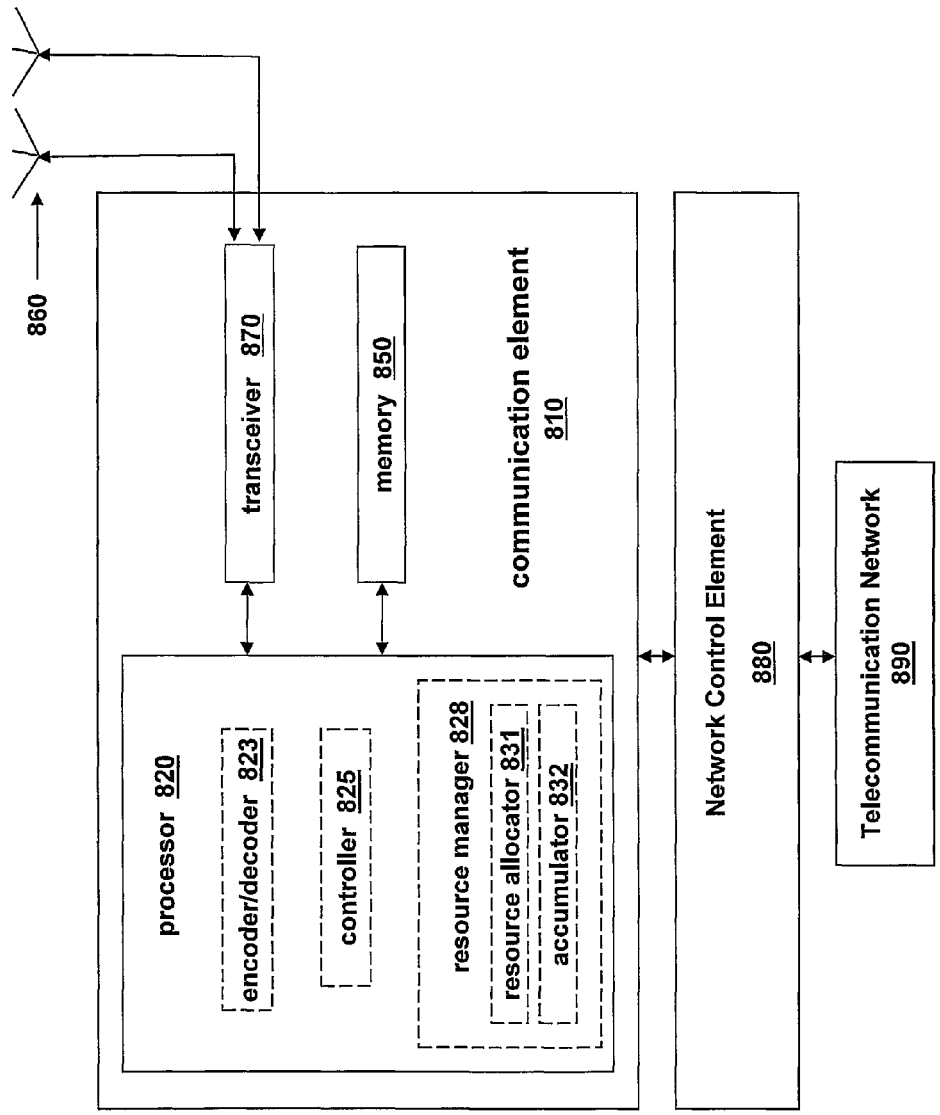
FIG. 8 illustrates a system level diagram of an embodiment of a communication element of a communication system constructed in accordance with the principles of the present invention.

Turning now to FIG. 8, illustrated is a system level diagram of an embodiment of a communication element 810 of a communication system constructed in accordance with the principles of the present invention. The communication element or device 810 may represent, without limitation, a base station, a mobile station (e.g., a subscriber station, a terminal, a user equipment, a wireless communication device), a network control element, a local area support node, or the like. The communication element 810 includes, at least, a processor 820 and memory 850 that stores programs and data of a temporary or more permanent nature. The communication element 810 may also include a radio frequency transceiver 870 coupled to the processor 820 and a plurality of antennas (one of which is designated 860). The communication element 810 may provide point-to-point and/or point-to-multi-point communication services.

The communication element 810, such as a base station in a cellular network, may be coupled to a communication network element, such as a network control element 880 coupled to a public switched telecommunication network 890 ("PSTN"). The network control element 880 may, in turn, be formed with a processor, memory, and other electronic elements (not shown). The network control element 880 generally provides access to a telecommunication network such as a PSTN 890. Access may be provided using fiber optic, coaxial, twisted pair, microwave communication, or similar link coupled to an appropriate link-terminating element. A communication element 810 formed as a mobile station is generally a self-contained device intended to be carried by an end user.

The processor 820 in the communication element 810, which may be implemented with one or a plurality of processing devices, performs functions associated with its operation including, without limitation, encoding and decoding (encoder/decoder 823) of individual bits forming a communication message, formatting of information, and overall control (controller 825) of the communication element, including processes related to management of resources represented by a resource manager 828. Exemplary functions related to management of resources include, without limitation, hardware installation, traffic management, performance data analysis, tracking of end users and equipment, configuration management, end user administration, management of mobile stations, management of tariffs, subscriptions, and billing, accumulation and management of characteristics of a local area network, and the like.

When the communication element 810 is formed as a mobile station, the resource manager 828 includes a resource allocator 831 configured to generate a message for a GSM network requesting at least one characteristic of a local area network (e.g., from a local area support node), and an accumulator 832 configured to receive the at least one characteristic of the local area network (e.g., a WiFi network) from the local area support node to enable the communication element 810 to communicate with the local area network. In accordance therewith, the communication element 810 is configured to change a characteristic of the local area network via the resource manager 828. The message may be one of a control plane message and a user plane message as a function of a length and delay sensitivity of the message. The message for the GSM network may be transmitted over a stand-alone dedicated control channel or a packet data traffic channel. The message may be a short message system message and may include a location of the communication element 810. The GSM network may receive the at least one characteristic over a non-wireless communication path from the local area network, and the at least one characteristic includes an operating frequency of the local area network, a request for the local area network to enter an active mode, an authorization key of the local area network and presence information of devices available for device-to-device communication with the communication element 810.

When the communication element 810 is formed as a local area support node associated with a GSM network, the accumulator 1032 is configured to receive a message from a mobile station requesting at least one characteristic of a local area network (e.g., a WiFi network), and the resource allocator 831 is configured to provide the at least one characteristic to enable the mobile station to access the local area network. The message sent to the GSM network may be one of a control plane message and a user plane message as a function of a length and delay sensitivity of the message. The message for the GSM network may be received over a stand-alone dedicated control channel or a packet data traffic channel. The message may be a short message system message and may include a location of the mobile station. The local area support node associated with the GSM network may receive the at least one characteristic over a non-wireless communication path from the local area network, and the at least one characteristic includes an operating frequency of the local area network, a request for the local area network to enter an active mode, an authorization key of the local area network and presence information of devices available for device-to-device communication with the mobile station.

The execution of all or portions of particular functions or processes related to management of resources may be performed in equipment separate from and/or coupled to the communication element 810, with the results of such functions or processes communicated for execution to the communication element 810. The processor 820 of the communication element 810 may be of any type suitable to the local application environment, and may include one or more of general-purpose computers, special purpose computers, microprocessors, digital signal processors ("DSPs"), and processors based on a multi-core processor architecture, as non-limiting examples.

The transceiver 870 of the communication element 810 modulates information onto a carrier waveform for transmission by the communication element 810 via the antenna 860 to another communication element. The transceiver 870 demodulates information received via the antenna 860 for further processing by other communication elements. The transceiver 870 is capable of supporting duplex operation for the communication element 810.

The memory 850 of the communication element 810, as introduced above, may be of any type suitable to the local application environment, and may be implemented using any suitable volatile or nonvolatile data storage technology such as a semiconductor-based memory device, a magnetic memory device and system, an optical memory device and system, fixed memory, and removable memory. The programs stored in the memory 850 may include program instructions that, when executed by an associated processor, enable the communication element 810 to perform tasks as described herein. Of course, the memory 850 may form a data buffer for data transmitted to and from the communication element 810. Exemplary embodiments of the system, subsystems, and modules as described herein may be implemented, at least in part, by computer software executable by processors of, for instance, the mobile station and the local area support node, or by hardware, or by combinations thereof. As will become more apparent, systems, subsystems and modules may be embodied in the communication element 810 as illustrated and described herein.

Figure 9:
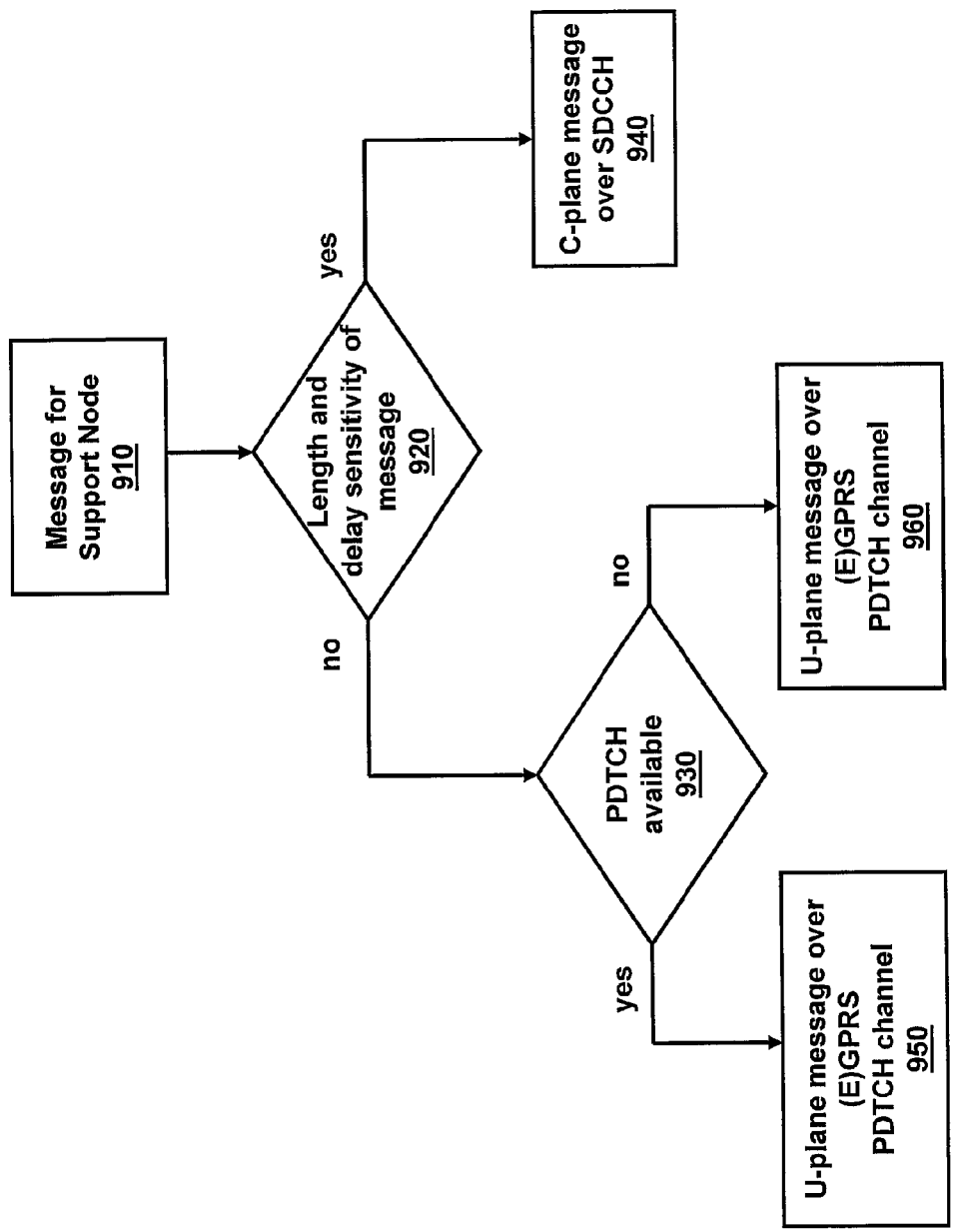
FIG. 9 illustrates a block diagram demonstrating an exemplary operation of transporting a message between a mobile station and a local area support node in accordance with the principles of the present invention.

Turning now to FIG. 9, illustrated is a block diagram demonstrating an exemplary operation of transporting a message between a mobile station and a local area support node in accordance with the principles of the present invention. More specifically, FIG. 9 illustrates a decision process for the mobile station to encapsulate and send a message to a local area support node associated with a wide are network such as a GSM network as a function of a length and delay sensitivity of the message. When the mobile station generates a message for the local area support node, as indicated in a module 910, the mobile station compares the length and delay sensitivity of the message against a threshold, as illustrated in module 920.

If the message is short (such as a message less than 45 bytes) and is delay sensitive, then the mobile station may encapsulate the message in a control plane message to be transmitted over, for instance, a stand-alone dedicated control channel for the local area support node, as indicated in module 940. If the message is larger (such as a message greater than 45 bytes) or delay insensitive, then the mobile station may encapsulate the message in a user plane message to be transmitted over, for instance, a packet data traffic channel or a circuit-switched data channel for the local area support node. If a packet data traffic channel is available (e.g., (evolved) general packet radio service is supported), as indicated in a module 930, then the mobile station transmits the user plane message over the packet data traffic channel, as indicated in a module 950. Otherwise, the mobile station transmits the user plane message over the circuit-switched data channel, as indicated in a module 960.

As mentioned above, the local area support node may be incorporated in or associated with a mobile switching center of the GSM network. As an example, when the mobile switching center receives a control plane message over the stand-alone dedicated control channel for the local area support node, the connection management sublayer of layer 3 of the mobile switching center can process the control plane message analogous to a short message service message. Thus, it is transparent to the base station controller, and no change to the A interface between a base station and the mobile switching center is necessary. Hence, the local area support node functionality can be integrated into the mobile switching center, or the mobile switching center can forward local area messages to the local area support node. In accordance therewith, a new service access point can be defined to handle local area messages such as a local area support-service access point ("LAS-SAP").

If the local area support node is outside of the GSM network, for example, in the Internet, a gateway (similar to an SMS Gateway Mobile Switching Center ("SMS-GMSC") or to an SMS Interworking Mobile Switching Center ("SMS-IWMSC")) could be introduced through which the local area messages are forwarded. Forwarding inside the GSM network could work similar to that for short message service messages and utilize standard network interfaces and protocols. If the GSM network is GPRS capable, the mobile switching center can, for example, forward local area messages to the SGSN via the Gs interface. The Gs interface runs the Base Station System Application Part ("BSSAP"), which is also used for the A interface, and no updates to the interface as such are necessary. However, in this case, modifications to the SGSN may be employed to recognize local area messages and to forward the same to the Gateway GPRS Support Node ("GGSN") in the appropriate format.

Figure 10:
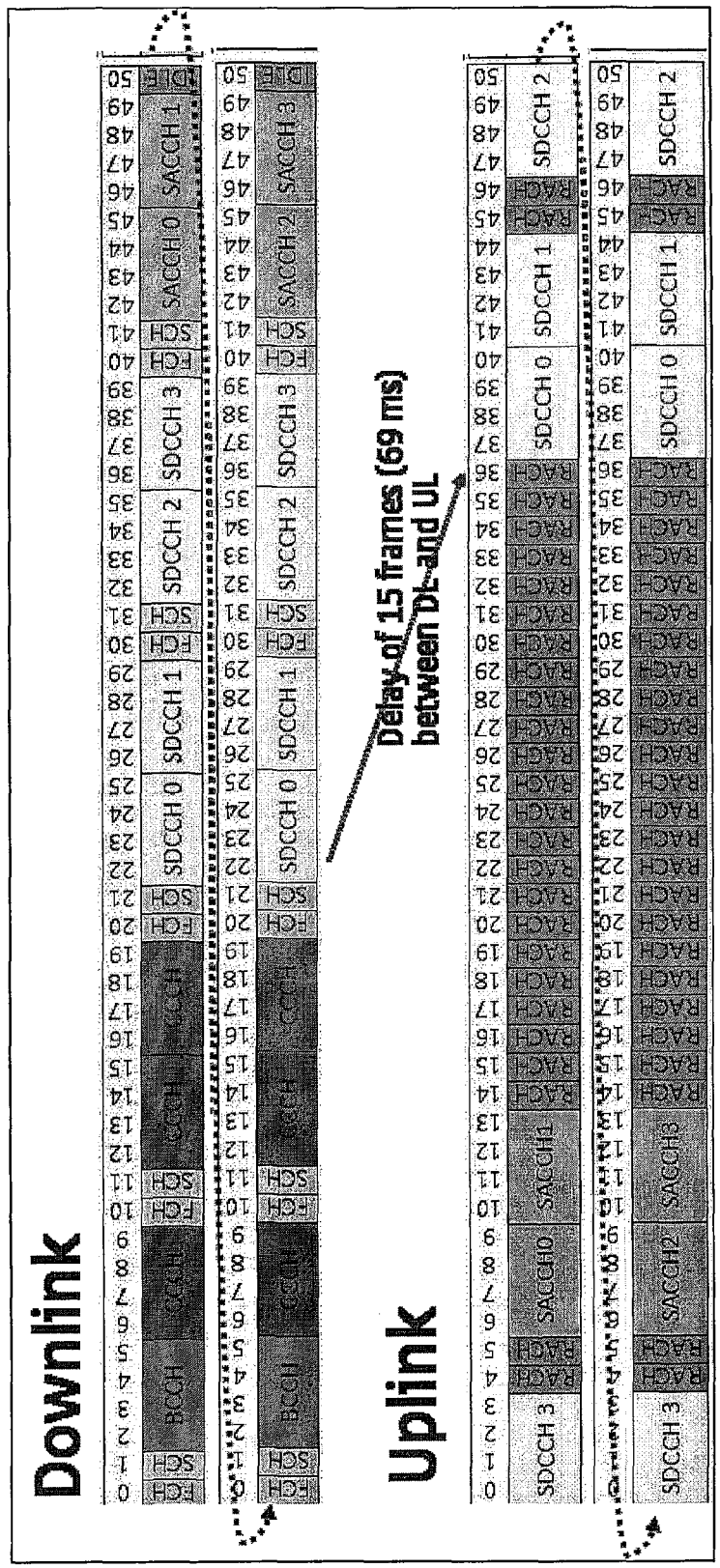
FIGS. 10 and 11 illustrate block diagrams of embodiments of control channel superframes between a mobile station and a mobile switching center in accordance with the principles of the present invention.
Figure 11:
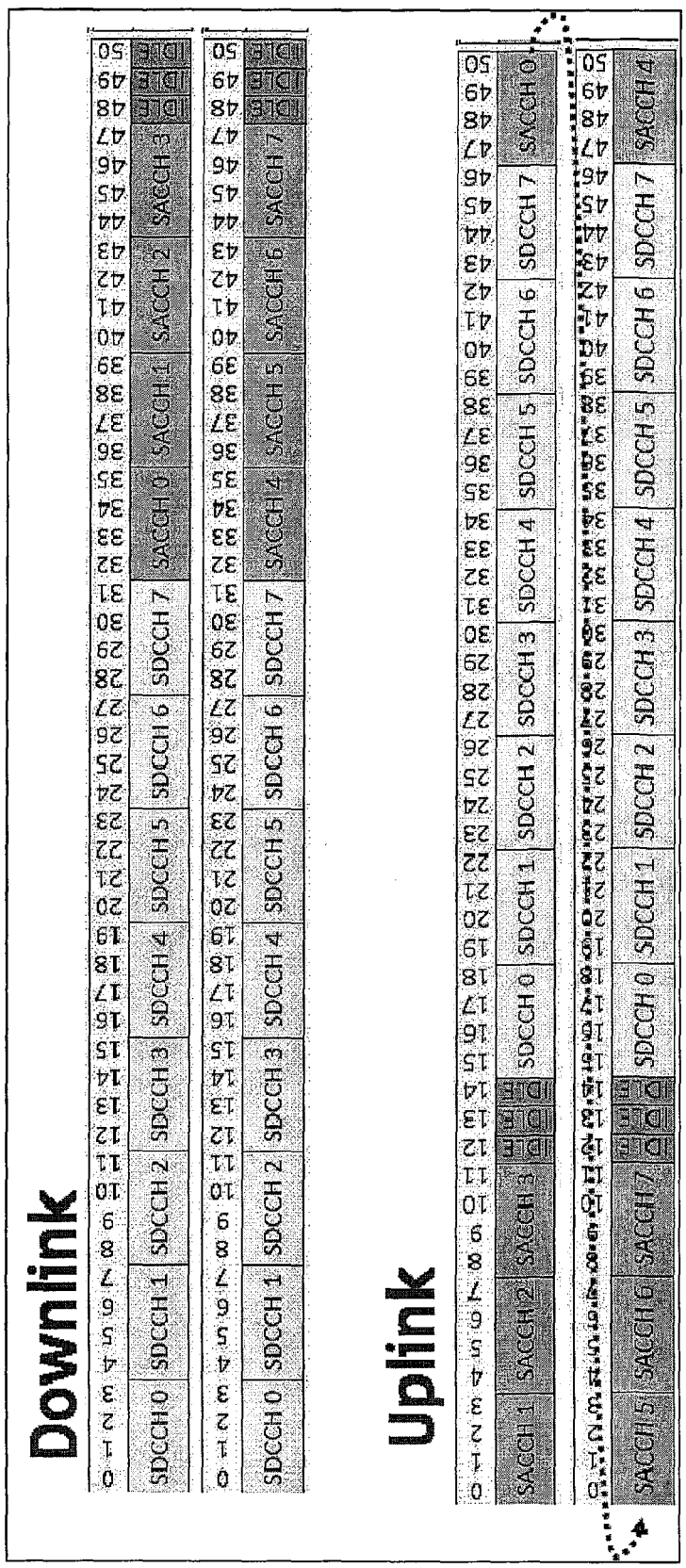

Turning now to FIGS. 10 and 11, illustrated are block diagrams of embodiments of control channel superframes between a mobile station and a mobile switching center in accordance with the principles of the present invention. In particular, the diagrams illustrate two control channel superframes in a downlink and two control channel superframes in an uplink between the mobile station and the mobile switching center. The individual frames in a downlink and in an uplink are numbered 0, 1, . . . , 50, and the locations of particular stand-alone dedicated control channels are shown. Other channel types such as a random access channel ("RACH"), a slow access control channel ("SACCH"), a broadcast control channel ("BCCH"), and a common control channel ("CCCH") are illustrated as well. A network operator can select alternative 1, as illustrated in FIG. 10, or alternative 2, as illustrated in FIG. 11, according to GSM network conditions. In either case, a number of stand-alone dedicated control channels are available in a downlink and in an uplink for low-delay control-plane communication between the mobile station and the mobile switching center.

The stand-alone dedicated control channel is generally used both for control signaling and for short message service messages. Therefore, an alternative implementation of the local area support node can simply employ a phone number, and can receive the control plane messages as short message service messages. Similarly, local area support node can send the control plane messages to a mobile station as short message service messages. This latter would require including the additional overhead (i.e., the recipient's phone number and the address of the Short Messaging Service Center, ("SMSC")) and incur delay from sending a short message service message. The additional delays are, for example, caused by the procedures required to locate the recipient of the short message service message such as delays associated with contacting the home location register and the visitor location register, delays in the Short Messaging Service Center, ("SMSC"), and delays in contacting the gateway.

The allowed channel combinations for stand-alone dedicated control channel in GSM Release 1999, as described in 3GPP TS 05.02, Technical Specification Group GSM/EDGE, entitled "Radio Access Network; Multiplexing and Multiple Access on the Radio Path," June 2003, which is incorporated herein by reference, are set forth below.

Alternative 1, as illustrated in FIG. 10: FCH+SCH+BCCH+CCCH+SDCCH/4(0.3)+SACCH/C4(0 . . . 3), and Alternative 2, as illustrated in FIG. 11: SDCCH/8(0 . . . 7)+SACCH/C8(0 . . . 7), wherein FCH is a frequency correction channel, SCH is a synchronization channel, BCCH is a broadcast control channel, CCCH is a common control channel, SDCCH is a stand-alone dedicated control channel, and SACCH is a slow associated control channel.

In alternative 2, the regular packet data traffic channel may be used, and IP packets are sent over the user plane to the local area support node. This requires setting up the packet data protocol context and causes associated delays of about 1.5 seconds. Therefore, time-critical control plane messages sent on the stand-alone dedicated control channel should be short enough to be carried by that channel type.

Thus, as introduced herein, a mobile station decides what kind of wide area GSM channels to use for certain control plane messages for a local area support node. In addition to message size and delay sensitivity, the decision by the mobile station on the mechanism to send the message can also depend on the expected number of messages. A one-time message sufficiently short would be sent via stand-alone dedicated control channel. If multiple messages are expected to be sent or received over a limited period of time, the packet data traffic channel may be used. Fast message exchange between a mobile station and a local area support node is thereby enabled with standardization of signaling, which supports the local area network and the GSM network operation through control plane messages encapsulated in existing wide area network signaling such as GSM network signaling.

Program or code segments making up the various embodiments of the present invention may be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a read only memory ("ROM"), a flash memory, an erasable ROM ("EROM"), a floppy diskette, a compact disk ("CD")-ROM, an optical disk, a hard disk, a fiber optic medium, a radio frequency ("RF") link, and the like. The computer data signal may include any signal that can propagate over a transmission medium such as electronic communication network channels, optical fibers, air, electromagnetic links, RF links, and the like. The code segments may be downloaded via computer networks such as the Internet, Intranet, and the like.

As described above, the exemplary embodiment provides both a method and corresponding apparatus consisting of various modules providing functionality for performing the steps of the method. The modules may be implemented as hardware (embodied in one or more chips including an integrated circuit such as an application specific integrated circuit), or may be implemented as software or firmware for execution by a computer processor. In particular, in the case of firmware or software, the exemplary embodiment can be provided as a computer program product including a computer readable storage structure embodying computer program code (i.e., software or firmware) thereon for execution by the computer processor.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. Also, many of the features, functions and steps of operating the same may be reordered, omitted, added, etc., and still fall within the broad scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus, comprising:
a resource allocator configured to generate a message for a Global System for Mobile Communications network requesting at least one characteristic of a local area network; and
an accumulator configured to receive said at least one characteristic of said local area network to enable a mobile station to communicate with said local area network,
wherein said message for said Global System for Mobile Communications network comprises one of a control plane message and a user plane message as a function of a length and delay sensitivity of said message, and
wherein said mobile station is configured to compare said length and delay sensitivity of said message against a threshold to determine whether to encapsulate said message as said control plane message or said user plane message and to further determine whether said message is to be transmitted over a stand-alone dedicated control channel, a packet data traffic channel, or a circuit switched data channel based on said message being encapsulated as said control plane message or said user plane message.

2. The apparatus as recited in claim 1 further comprising a resource manager configured to change a characteristic of said local area network.

3. The apparatus as recited in claim 1 wherein said message for said Global System for Mobile Communications network is transmitted over one of a stand-alone dedicated control channel and a packet data traffic channel.

4. The apparatus as recited in claim 1 wherein said message for said Global System for Mobile Communications network includes a location of said mobile station.

5. The apparatus as recited as recited in claim 1 wherein said message for said Global System for Mobile Communications network is a short message system message.

6. The apparatus as recited in claim 1 wherein said Global System for Mobile Communications network is configured to receive said at least one characteristic over a non-wireless communication path from said local area network.

7. The apparatus as recited in claim 1 wherein said at least one characteristic is selected from the group consisting of:
an operating frequency of said local area network,
a request for said local area network to enter an active mode,
an authorization key of said local area network, and
presence information of devices available for device-to-device communication with said mobile station.

8. The apparatus as recited in claim 1 wherein said Global System for Mobile Communications network comprises a support node associated with a mobile switching center for accumulating said at least one characteristic of said local area network, or wherein said local area network is a WiFi network.

9. An apparatus, comprising:
an accumulator configured to receive a message from a mobile station requesting at least one characteristic of a local area network; and
a resource allocator configured to provide said at least one characteristic via a local area support node associated with a Global System for Mobile Communications network to enable said mobile station to access said local area network,
wherein said message from said mobile station comprises one of a control plane message and a user plane message as a function of a length and delay sensitivity of said message, and
wherein said mobile station is configured to compare said length and delay sensitivity of said message against a threshold to determine whether to encapsulate said message as said control plane message or said user plane message and to further determine whether said message is to be transmitted over a stand-alone dedicated control channel, a packet data traffic channel, or a circuit switched data channel based on said message being encapsulated as said control plane message or said user plane message.

10. The apparatus as recited in claim 9 wherein said mobile station is configured to change a characteristic of said local area network.

11. The apparatus as recited in claim 9 wherein said message from said mobile station is received over one of a stand-alone dedicated control channel and a packet data traffic channel.

12. The apparatus as recited in claim 9 wherein said message from said mobile station includes a location of said mobile station.

13. The apparatus as recited in claim 9 wherein said message from said mobile station is a short message system message.

14. The apparatus as recited in claim 9 wherein said Global System for Mobile Communications network is configured to receive said at least one characteristic over a non-wireless communication path from said local area network.

15. The apparatus as recited in claim 9 wherein said at least one characteristic is selected from the group consisting of:
an operating frequency of said local area network,
a request for said local area network to enter an active mode,
an authorization key of said local area network, and
presence information of devices available for device-to-device communication with said mobile station.

16. The apparatus as recited in claim 9 wherein said local area support node is associated with a mobile switching center of said Global System for Mobile Communications network, or wherein said local area network is a WiFi network.

17. A method, comprising:
generating a message for a Global System for Mobile Communications network requesting at least one characteristic of a local area network; and
receiving said at least one characteristic of said local area network to enable a mobile station to communicate with said local area network,
wherein said message transmitted over one of a stand-alone dedicated control channel and a packet data traffic channel for said Global System for Mobile Communications network comprises one of a control plane message and a user plane message as a function of a length and delay sensitivity of said message, and wherein said mobile station is configured to compare said length and delay sensitivity of said message against a threshold to determine whether to encapsulate said message as said control plane message or said user plane message and to further determine whether said message is to be transmitted over said stand-alone dedicated control channel, said packet data traffic channel, or a circuit switched data channel based on the message being encapsulated as said control plane message or said user plane message.

18. The method as recited in claim 17 further comprising changing a characteristic of said local area network.

19. The method as recited in claim 17 wherein said at least one characteristic is selected from the group consisting of:

an operating frequency of said local area network, a request for said local area network to enter an active mode, an authorization key of said local area network, and presence information of devices available for device-to-device communication with said mobile station.

* * * * *